United States Patent
Proffitt et al.

[11] Patent Number: 6,138,047
[45] Date of Patent: Oct. 24, 2000

[54] LOW FREQUENCY PWM GENERATION METHOD FOR A MICROPROCESSOR-BASED CONTROLLER

[75] Inventors: Jerry L. Proffitt, Wabash; Lawrence Edward Piekarski, Russiaville, both of Ind.

[73] Assignee: Delco Electronics Corporation, Kokomo, Ind.

[21] Appl. No.: 09/021,018

[22] Filed: Feb. 9, 1998

[51] Int. Cl.[7] ................................................. G05B 11/01
[52] U.S. Cl. ............................... 700/14; 700/1; 713/502
[58] Field of Search ................................... 327/273, 164, 327/172; 332/109; 375/238; 713/500, 501, 502; 700/1, 14; 363/41; 318/599, 603

[56] References Cited

U.S. PATENT DOCUMENTS

| | | | |
|---|---|---|---|
| 4,754,466 | 6/1988 | McCambridge | 375/238 |
| 4,891,825 | 1/1990 | Hansen | 377/52 |
| 5,023,535 | 6/1991 | Miller et al. | 318/599 |
| 5,146,601 | 9/1992 | Hosaka et al. | 713/501 |
| 5,293,628 | 3/1994 | Langan et al. | 713/502 |
| 5,298,871 | 3/1994 | Shimohara | 332/102 |
| 5,418,932 | 5/1995 | Watabe et al. | 713/500 |
| 5,471,635 | 11/1995 | Williams | 713/500 |
| 5,594,894 | 1/1997 | Mitra | 713/501 |
| 5,631,592 | 5/1997 | Schwarz et al. | 327/172 |
| 5,809,290 | 9/1998 | DeRoo et al. | 713/500 |
| 5,812,831 | 9/1998 | Crocker | 713/500 |

Primary Examiner—William Grant
Assistant Examiner—Paul L Rodriguez
Attorney, Agent, or Firm—Jimmy L. Funke

[57] ABSTRACT

An improved method of operation for a microprocessor-based controller wherein a frequency limited counter can be used to generate low frequency PWM signals having on and/or off periods that exceed the period of the microprocessor's free-running counter. The improved method of operation involves comparing the requested PWM period (on or off) to the counter period, and determining if multiple counter periods are required to generate the requested PWM period. If multiple counter periods are required, the controller configures the PWM output port to maintain its current logic level until the requested period has timed out. In this way, the microprocessor can accurately generate the requested low frequency PWM output signals without requiring any hardware modifications.

4 Claims, 3 Drawing Sheets

LOW FREQUENCY PWM GENERATION METHOD FOR A MICROPROCESSOR-BASED CONTROLLER

This invention relates to the generation of low frequency pulse-width-modulation (PWM) signals for control or communication purposes, and more particularly to a method of operation for use with a microprocessor-based controller having a limited period timer.

BACKGROUND OF THE INVENTION

Microprocessor-based controllers are commonly used to generate pulse-width-modulation (PWM) output signals for control or communication purposes, and frequently include one or more output ports specifically designed to perform this task. In a typical arrangement, the microprocessor includes a multiple-stage free-running counter operating at a predefined clock frequency, and the PWM output port includes a register for temporary storage of a PWM on or off interval and comparator circuitry or software for comparing the counter value to the value of the PWM data stored in the register. The port can be configured by the system software to change the logic level of its PWM output when the comparison yields a match, and to generate an interrupt request triggering the system software to re-load the register with the next PWM data value.

A limitation of the above-described arrangement is that the controller is unable to generate the long periods of a low frequency PWM signal. Suppose, for example, that the base counter frequency is 100 Hz, so that the counter overflows every 10 msec. If the controller is required to generate a PWM output at a lower frequency, the on or off interval of the required PWM signal may exceed the period of the counter, rendering the usual PWM generation method ineffective.

SUMMARY OF THE PRESENT INVENTION

The present invention is directed to an improved method of operation for a microprocessor-based controller wherein a capacity limited counter can be used to generate low frequency PWM signals having on and/or off periods that exceed the period of the counter. The improved method involves comparing the requested PWM interval (on or off) to the counter period, and determining if multiple counter periods are required to generate the requested PWM interval. If multiple counter periods are required, the controller configures the PWM output port to maintain its current logic level until the requested period has timed out. In this way, the microprocessor can accurately generate the requested low frequency PWM output signals without requiring any hardware modifications.

DETAILED DESCRIPTION OF THE DRAWINGS

Figure 1:
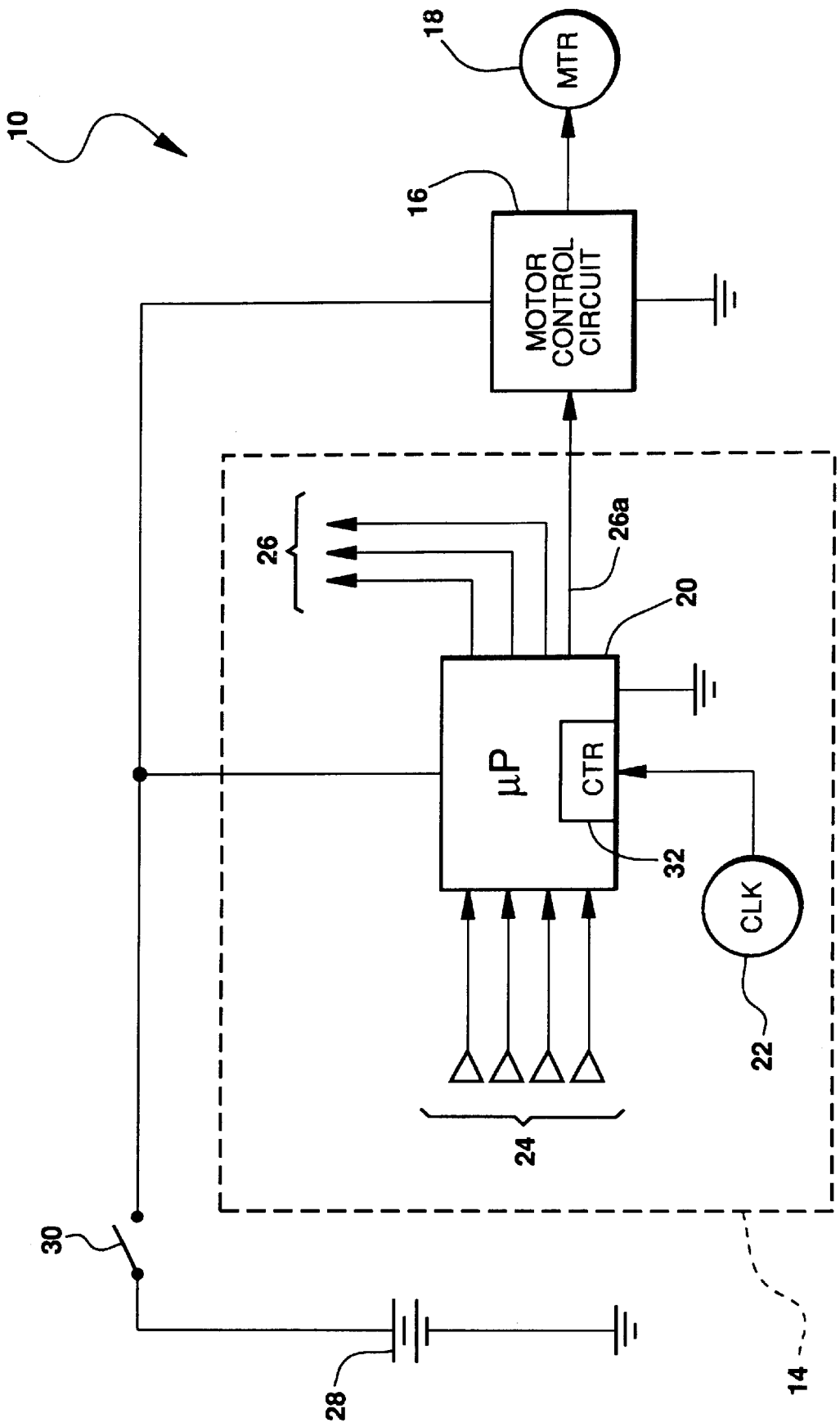
FIG. 1 is a block diagram of a an exemplary microprocessor-based control system in which the method of operation of this invention is utilized.

Referring to the drawings, and particularly to FIG. 1, the reference numeral 10 generally designates a control system in which the method of operation of the present invention is utilized. The control system 10, which may be a vehicle air controller, includes a microprocessor-based control head 14, a motor control circuit 16, and a motor 18. The control head 14, which may be located in an automotive instrument panel, includes a microprocessor (uP) 20, a free-running clock 22, and a number of control switches and/or sensors 24 which provide inputs to microprocessor 20. In the exemplary system, the inputs may provide temperature or fan speed settings, or an indication of a measured temperature in the passenger compartment of the vehicle. Based on the various inputs, the microprocessor 20 develops a number of outputs 26 for the direct or indirect control of various actuators such as the motor 18, which may be a ventilation fan motor. One such output, designated by the reference numeral 26a, provides a PWM-based speed command to the motor control circuit 16, which includes conventional driver circuits for energizing the motor 18 to operate at the commanded speed. Power for operating the microprocessor 20 and the motor control circuit 16 is supplied by a storage battery 28, through ignition switch 30.

The above-described system is particularly advantageous in the automotive environment because it permits the heat producing motor control circuit 16 to be located remote from the instrument panel, and requires only a single wire interface between the control head 14 and the motor control circuit 16. The PWM signal generated on line 26a typically has a fixed frequency determined by the design of the motor control circuit 16, and the PWM duty cycle of the signal communicates the motor speed command to the motor control circuit 16. For example, a low duty cycle having an on/off period ratio of 0.04, or 4%, might correspond to the minimum motor speed, while a high duty cycle having an on/off ratio of 0.96, or 96%, might correspond to a maximum motor speed.

The microprocessor 20 includes a multiple-stage free-running counter 32 which receives the output signal of clock 22 to facilitate the generation of various PWM output signals, such as the signal on line 26a. The microprocessor 20 further includes a register for temporary storage of a requested PWM on or off interval and comparator circuitry or software for comparing the counter value to the value of the PWM data stored in the register. The port can be configured by the system software, through the use of flags, for example, to change the logic level of its PWM output when the match occurs, and to generate an interrupt request triggering the system software to re-load the register with the next PWM data value. By way of example, one commercially available microprocessor satisfying the above requirements is the 68HC08 microprocessor, manufactured and distributed by Motorola, Inc.

As indicated above, the present invention is directed to a method of operation for the microprocessor 20 which enables the generation of low frequency PWM control signals having on and/or off periods that exceed the maximum count of the counter 32. Normally, the microprocessor 20 is incapable of producing such low frequency signals without increasing the number of stages of the counter 32, since the counter overflow introduces ambiguity into the count comparison. Briefly, the method of operation of this invention involves determining the requested PWM on or off period, comparing the requested PWM period to the maximum counter period, and determining if multiple counter periods are required to generate the requested PWM period. If multiple counter periods are required, the microprocessor's PWM output port is configured to maintain its current logic state until the requested period has timed out.

Figure 2:
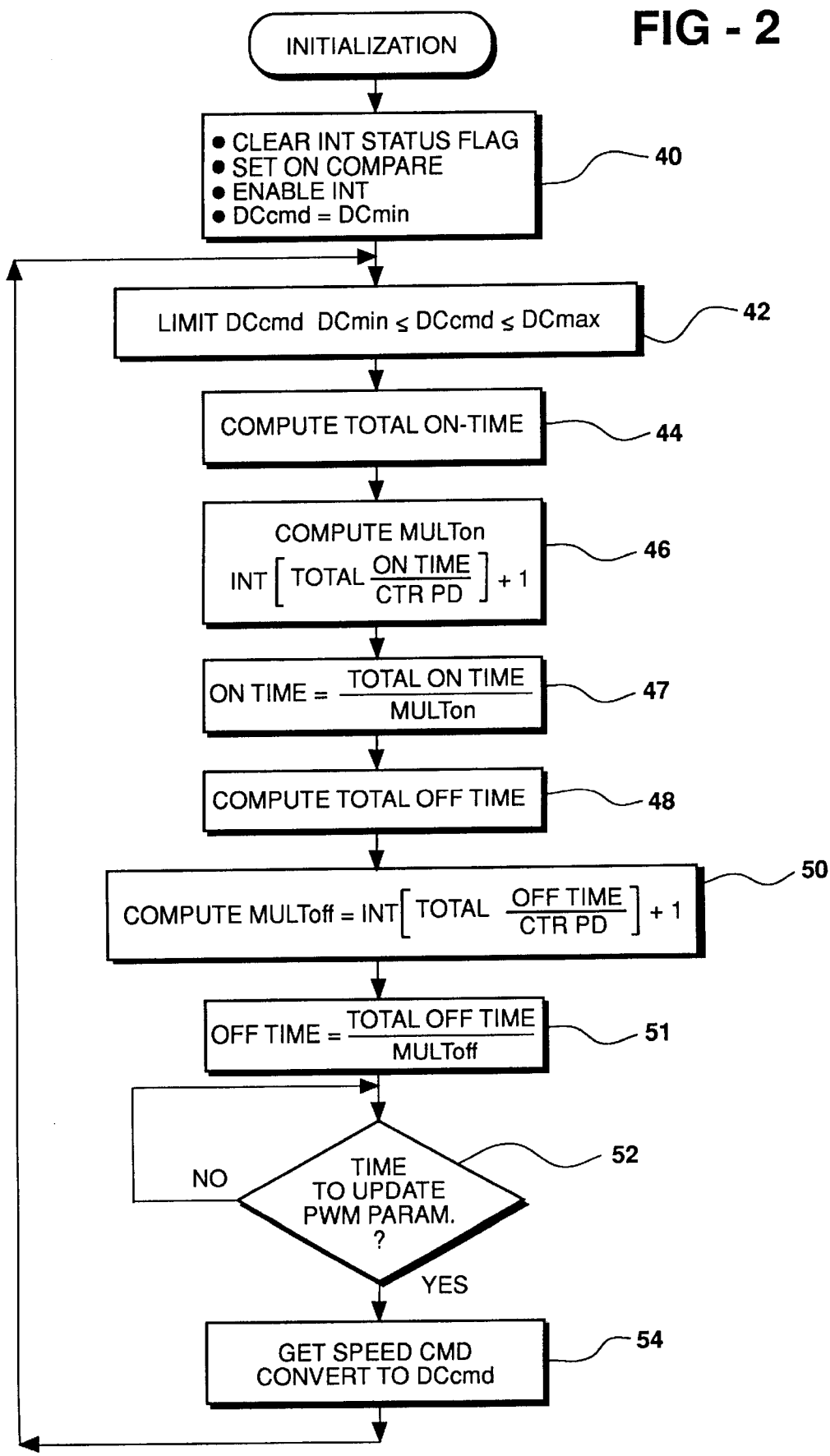
FIG. 2 is a flow diagram of a main or executive program executed by the microprocessor of FIG. 1 in carrying out the control method of this invention.

The flow diagram of FIG. 2 represents a series of program instructions comprising a portion of a main or executive program executed by the microprocessor 20. The flow diagram of FIG. 3 represents the program instructions of an interrupt service routine that is executed in response to the generation of an interrupt request by the PWM comparator circuitry or software. executed in response to the generation of an interrupt request by the PWM comparator circuitry or software.

Referring to FIG. 2, the reference numeral 40 designates a series of instructions executed at the initiation of system operation, or upon a system reset in response to a detected failure condition. These instructions include (1) clearing the interrupt status flag to indicate that no interrupt is being serviced, (2) configuring the low frequency PWM port to set (that is, to a logic one state) in response to the next compare, or match, between the counter 32 and the compare value (CV), (3) enabling the servicing of interrupts, and (4) initializing the PWM duty cycle command DCcmd to a minimum value DCmin, such as 5%.

Following initialization, the blocks 42–54 are periodically executed to compare the on and off times associated with the duty cycle command DCcmd with the maximum counter period CTR PD, and to compute the value of a multiplier parameter MULT. At block 42, the duty cycle command DCcmd is constrained by lower and upper limits DCmin and DCmax, which may correspond, for example to 4% and 96%. Blocks 44 and 46 determine the corresponding PWM on-time (TOTAL ON TIME), and compute an on-time multiplier MULTon as a function of the ratio of the determined on-time to the maximum counter period CTR PD. If the determined on-time is not greater than the counter period, MULTon will have a value of one, signifying that only one counter period is required to schedule the desired on-time. If the determined on-time is greater than the counter period, MULTon will have a value of two or more, signifying that two or more counter periods are required to schedule the desired on-time. Block 47 then divides the TOTAL ON TIME by MULTon to determine the program loop on-time (ON TIME). Blocks 48 and 50 similarly determine the corresponding PWM off-time (TOTAL OFF TIME), and compute an off-time multiplier MULToff as a function of the ratio of the determined off-time to the maximum counter period CTR PD. Block 51 then divides the TOTAL OFF TIME by MULToff to determine the program loop off-time (OFF TIME). Block 52 defines the update rate of the PWM parameters, and periodically enables the execution of blocks 54 and 42–50 to get a new speed command corresponding to a duty cycle command DCcmd, and to update the on-time, off-time, MULTon and MULToff values as described above.

Figure 3:
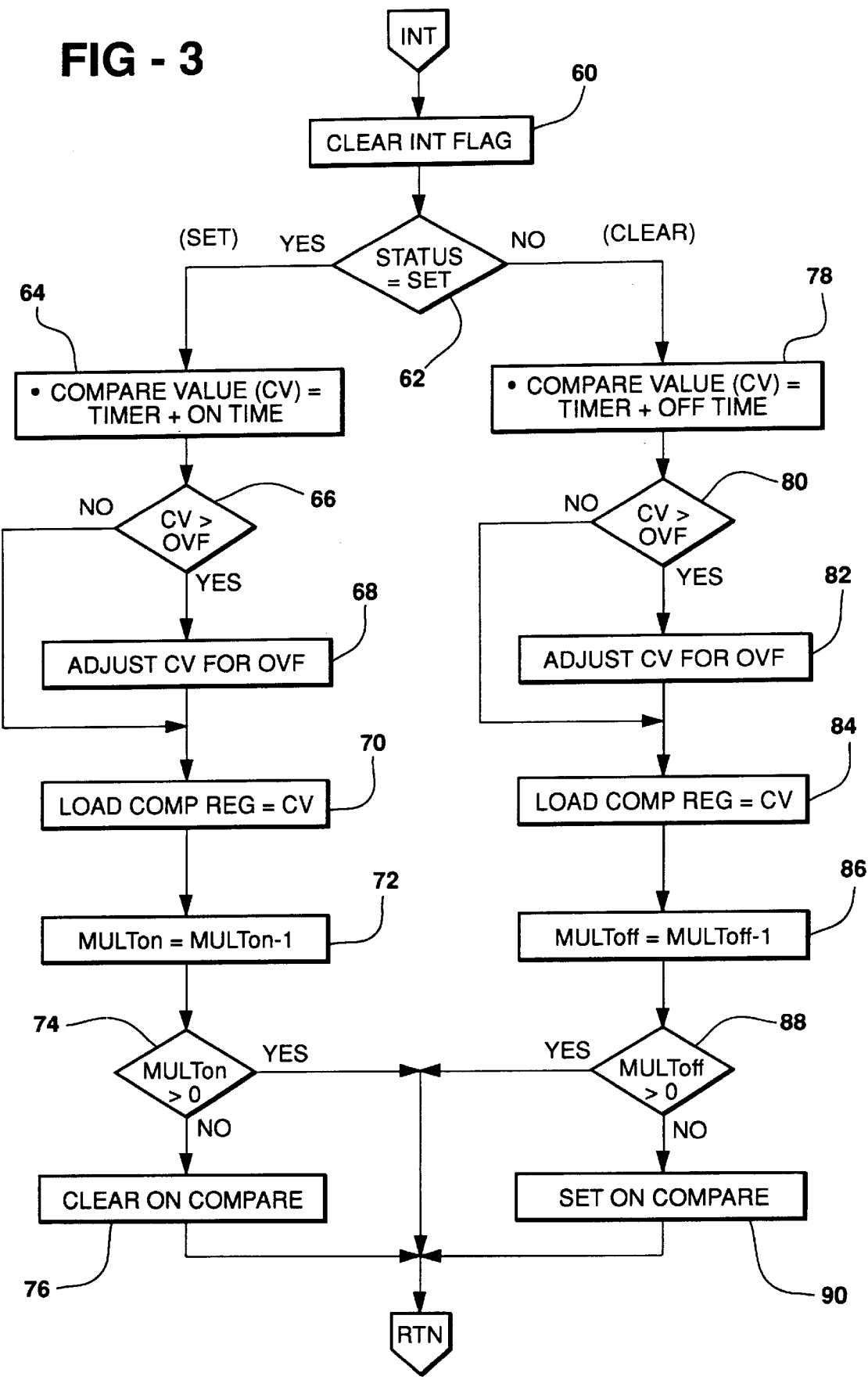
FIG. 3 is a flow diagram of an interrupt service routine executed by the microprocessor of FIG. 1 in carrying out the control method of this invention.

The flow diagram of FIG. 3 depicts a routine that is executed by microprocessor 20 each time the counter 32 matches the stored compare value CV. Initially, this occurs somewhat randomly, since it is the interrupt service routine that determines and stores the compare value CV. On each execution of the interrupt service routine, the block 60 is executed to clear the interrupt flag, and the block 62 is executed to determine if the PWM port is configured to set or clear in response to the interrupt. At first, the block 62 is answered in the affirmative due to the initialization instructions of block 40, triggering the execution of blocks 64–76. Block 64 computes a compare value CV according to the sum of the current counter value and the last determined value of ON TIME. If the compare value CV will exceed the overflow OVF or maximum counter value, as determined at block 66, the block 68 is executed to suitably adjust the compare value, reducing it by one or more multiples of the overflow value OVF. Then the blocks 70 and 72 are executed to load the compare value CV into the compare register and to decrement the on-time multiplier MULTon. If the decremented multiplier MULTon is still greater than zero, as determined at block 74, multiple counter periods are required to generate the TOTAL ON TIME, and the interrupt service routine is exited, maintaining the "set on compare" PWM port configuration. Otherwise, only one counter period is required to generate the TOTAL ON TIME, and the block 76 is executed to configure the PWM port to clear on compare.

The "clear on compare" branch of the interrupt service routine performs a similar functionality for the determined off-time. Thus, block 78 computes a compare value CV according to the sum of the current counter value and the last determined value of OFF TIME. If the compare value CV will exceed the overflow OVF or maximum counter value, as determined at block 80, the block 82 is executed to suitably adjust the compare value, reducing it by the overflow value OVF. Then the blocks 84 and 86 are executed to load the compare value CV into the compare register and to decrement the off-time multiplier MULToff. If the decremented multiplier MULToff is still greater than zero, as determined at block 88, multiple counter periods are required to generate the TOTAL OFF TIME, and the interrupt service routine is exited, maintaining the "clear on compare" PWM port configuration. Otherwise, only one counter period is required to generate the TOTAL OFF TIME, and the block 90 is executed to configure the PWM port to set on compare.

By way of example with reference to the foregoing, assume that the counter 32 has a maximum period of 10 msec, and that the motor control circuit 16 requires a variable duty cycle PWM signal at a frequency of 35 Hz. At the maximum pulse width of 96%, this corresponds to a TOTAL ON TIME of 27.43 msec, and an on-time multiplier value of MULTon=3. Assume that the PWM signal on line 26a just transitioned from low-to-high, and that the PWM port is configured to "set on compare". In servicing the interrupt, block 72 will decrement MULTon to a value of two, and the PWM port will remain configured to "set on compare". On the next match of the counter and compare register, the PWM output will remain high (set), and in servicing the interrupt, block 72 will decrement MULTon to a value of one, and the PWM port will remain configured to "set on compare". On the next match of the counter and compare register, the PWM output will remain high (set), and in servicing the interrupt, block 74 will be answered in the negative, and block 76 will be executed to configure the PWM port to "clear on compare". Thus, for this example, the PWM output is maintained in a set state for between two and three periods of the counter 32.

In summary, the method of this invention gives a microprocessor-based controller the flexibility to generate PWM output signals of relatively low frequency and at duty cycles which result in on or off periods that exceed the capacity of an internal counter. The method of operation is achieved in software, avoiding any cost penalty associated with the addition of discrete circuitry or further counter stages.

While this invention has been described in reference to the illustrated embodiment, it is expected that various modifications in addition to those suggested above will occur to those skilled in the art. In this regard, it will be understood that the scope of this invention is not limited to the illustrated embodiment, and that methods of operation incorporating such modifications may fall within the scope of this invention, which is defined by the appended claims.

What is claimed is:

1. A method of operation for a control system in which a microprocessor generates a pulse width modulation (PWM) output signal in accordance with a PWM command, the microprocessor having a stored count, a fixed period clock pulse counter and an output port that drives the output signal to a specified first or second state when said counter matches said stored count, the method of operation comprising the steps of:

determining a commanded first state time and a commanded second state time corresponding to said PWM command;

computing a first state multiplier corresponding to the number of periods of said counter required to form the commanded first state time, and sub-dividing the commanded first state time with said first state multiplier to form a time increment of said first state that is within the fixed period of the counter;

computing a second state multiplier corresponding to the number of periods of said counter required to form the commanded second state time, and sub-dividing the commanded second state time with said second state multiplier to form a time increment of said second state that is within the fixed period of the counter; and upon the occurrence of each match between said counter and said stored count:

determining the specified state of said output port;

setting the stored count in accordance with the computed time increment of the specified state;

changing the specified state of said output port if a remaining portion of a commanded duration is within the period of said counter.

2. The method of operation of claim 1, including the steps of:

upon the occurrence of each match between said counter and said stored count:

decrementing said multiplier;

maintaining the specified state of said output port if the multiplier indicates that the remaining portion of the commanded duration exceeds the period of said counter; and changing the specified state of said output port if the multiplier indicates that the remaining portion of the commanded duration is within the period of said counter.

3. A method of operation for a control system in which a microprocessor generates a pulse width modulation (PWM) output signal in accordance with a PWM command, the microprocessor having a stored count, a fixed period clock pulse counter, and an output port configurable to drive the output signal to a specified first or second logic level when said counter matches said stored count, the method of operation comprising the steps of:

determining a commanded duration of the specified logic level based on said PWM command;

computing a multiplier corresponding to the number of periods of said counter required to form the commanded duration, and sub-dividing the commanded duration with said multiplier to form a program loop time that is within the fixed period of the counter; and upon the occurrence of a match between said counter and said stored count:

setting the stored count according to the sum of the counter and said program loop time;

configuring said output port to maintain the specified logic level if a remaining portion of the commanded duration exceeds the period of said counter; and configuring said output port to change the specified logic level if the remaining portion of the commanded duration is within the period of said counter.

4. The method of operation of claim 3, including the steps of:

upon the occurrence of a match between said counter and said stored count:

decrementing said multiplier;

configuring said output port to change the specified logic level when the multiplier has been decremented to zero.

* * * * *